United States Patent
Ranjbar et al.

(10) Patent No.: US 11,381,974 B2
(45) Date of Patent: Jul. 5, 2022

(54) METHOD AND ATTACK DETECTION FUNCTION FOR DETECTION OF A DISTRIBUTED ATTACK IN A WIRELESS NETWORK

(71) Applicant: TELEFONAKTIEBOLAGET LM ERICSSON (PUBL), Stockholm (SE)

(72) Inventors: Alireza Ranjbar, Espoo (FI); Nicklas Beijar, Kirkkonummi (FI)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 203 days.

(21) Appl. No.: 16/480,783

(22) PCT Filed: Nov. 22, 2017

(86) PCT No.: PCT/EP2017/080040
§ 371 (c)(1),
(2) Date: Jul. 25, 2019

(87) PCT Pub. No.: WO2018/141432
PCT Pub. Date: Aug. 9, 2018

(65) Prior Publication Data
US 2020/0021994 A1 Jan. 16, 2020

Related U.S. Application Data

(60) Provisional application No. 62/452,378, filed on Jan. 31, 2017.

(51) Int. Cl.
*H04W 12/122* (2021.01)
*H04L 9/40* (2022.01)
*H04W 28/02* (2009.01)

(52) U.S. Cl.
CPC ....... *H04W 12/122* (2021.01); *H04L 63/1416* (2013.01); *H04L 63/1425* (2013.01); *H04W 28/0215* (2013.01); *H04L 63/1458* (2013.01)

(58) Field of Classification Search
CPC .......... H04W 12/122; H04W 28/0215; H04W 12/12; H04W 4/38; H04W 4/70;
(Continued)

(56) References Cited

U.S. PATENT DOCUMENTS 7,295,831 B2 * 11/2007 Coleman ............. H04L 63/1416
455/67.11
7,567,516 B2 * 7/2009 Beshai ..................... H04L 45/22
370/352
(Continued)

FOREIGN PATENT DOCUMENTS

CN 104580222 A 4/2015
CN 105493450 A 4/2016

OTHER PUBLICATIONS

International Search Report and the Written Opinion of the International Searching Authority, issued in corresponding International Application No. PCT/EP2017/080040, dated Feb. 13, 2018, 16 pages.
(Continued)

*Primary Examiner* — Badrinarayanan
(74) *Attorney, Agent, or Firm* — Rothwell, Figg, Ernst & Manbeck, P.C.

(57) ABSTRACT

A method and an attack detection function (200), for detection of a distributed attack in a wireless network (206) to which multiple wireless devices are connected via network nodes (210). It is checked whether characteristics of a traffic flow from each of a plurality of wireless devices (208) fulfil a predefined threshold condition related to abnormal traffic originating from the wireless devices, or not. When detecting that said characteristics of traffic flow fulfil the threshold condition, changes of the traffic flows from the wireless devices are identified, e.g. based on statistics on previous traffic originating from the wireless devices. It can then be
(Continued)

determined whether the wireless devices are used in the distributed attack, based on said identified changes of the traffic flows.

19 Claims, 5 Drawing Sheets

(58) Field of Classification Search
CPC ............. H04L 63/1416; H04L 63/1425; H04L 63/1458; G06F 21/554
USPC .......................................................... 726/23
See application file for complete search history.

(56) References Cited

U.S. PATENT DOCUMENTS

| | | | | |
|---|---|---|---|---|
| 8,584,236 | B2* | 11/2013 | El-Moussa | H04L 63/1458 726/23 |
| 9,282,115 | B1* | 3/2016 | Kaushik | H04L 63/1416 |
| 10,834,110 | B1* | 11/2020 | Edelstein | H04L 63/20 |
| 2005/0125195 | A1* | 6/2005 | Brendel | H04L 63/1425 702/182 |
| 2006/0010389 | A1* | 1/2006 | Rooney | H04L 63/1425 715/736 |
| 2007/0245420 | A1* | 10/2007 | Yong | H04L 63/1425 726/23 |
| 2007/0283436 | A1* | 12/2007 | Duffield | H04L 63/1425 726/23 |
| 2008/0222702 | A1* | 9/2008 | Liu | H04L 63/02 726/3 |
| 2009/0094671 | A1* | 4/2009 | Kurapati | H04L 63/1458 726/1 |
| 2011/0138463 | A1* | 6/2011 | Kim | H04L 63/1458 726/22 |
| 2012/0233311 | A1* | 9/2012 | Parker | H04L 43/022 709/224 |
| 2013/0254879 | A1* | 9/2013 | Chesla | H04L 63/1458 726/22 |
| 2014/0329516 | A1* | 11/2014 | Falconetti | H04W 48/20 455/418 |
| 2015/0193263 | A1* | 7/2015 | Nayyar | G06Q 10/06 707/703 |
| 2016/0028752 | A1* | 1/2016 | Di Pietro | H04L 63/1416 726/23 |
| 2016/0036838 | A1* | 2/2016 | Jain | H04L 67/10 726/23 |
| 2016/0182329 | A1* | 6/2016 | Armolavicius | H04L 41/147 370/230 |
| 2017/0208092 | A1* | 7/2017 | Ochse | H04L 63/1416 |
| 2021/0105251 | A1* | 4/2021 | Baldwin | H04L 63/1416 |

OTHER PUBLICATIONS

Giotis et al. "A scalable anomaly detection and mitigation architecture for legacy networks via an OpenFlow middlebox" Security and Communication Networks, 2016:9:1958-1970.

Gonzalez et al. "A Novel Distributed SDN-Secured Architecture for the IoT" 2016 International Conference on Distributed Computing in Sensor Systems, IEEE, pp. 244-249.

Bull et al. "Flow Based Security for IoT Devices using an SDN Gateway" 2016 IEEE 4th International Conference on Future Internet of Things and Cloud, pp. 157-163.

* cited by examiner

METHOD AND ATTACK DETECTION FUNCTION FOR DETECTION OF A DISTRIBUTED ATTACK IN A WIRELESS NETWORK

CROSS REFERENCE TO RELATED APPLICATION(S)

This application is a 35 U.S.C. § 371 National Phase Entry Application from PCT/EP2017/080040, filed Nov 22, 2017, designating the United States, and also claims the benefit of U.S. Provisional Application No. 62/452,378, filed Jan 31, 2017, the disclosures of which are incorporated herein by reference in their entirety.

TECHNICAL FIELD

The present disclosure relates generally to a method and an attack detection function for detection of a distributed attack resulting from manipulation of wireless devices in a wireless network.

BACKGROUND

In this disclosure, the term "wireless device" is used to represent any communication entity capable of radio communication with a radio network by sending and receiving radio signals, such as e.g. mobile telephones, sensors, and M2M (Machine-to-Machine) devices, the latter also known as MTC (Machine Type Communication) devices. Another common generic term in this field is "IoT (Internet of Things) sensor" which is frequently used herein as a non-limiting example of a wireless device.

In the field of wireless communication, it is becoming increasingly common to employ various sensors for monitoring an area, a machine or a component by performing various measurements and observations. The sensors typically report their measurements and observations over a wireless network, to be processed by some central control server or the like which may be operating in a cloud environment.

A sensor may for example be configured to measure and report some metric or parameter of potential interest, such as temperature, pressure, light, movements and sounds, to mention a few illustrative examples. The above-described sensors are typically configured to operate automatically and autonomously by reporting considerable amounts of data on a regular basis. Such sensors have been designed for simple operation at low cost and they often have poor implementations of higher layer protocols which are thus potentially very vulnerable to attacks.

In wireless networks, it is sometimes necessary to protect wireless devices across the network from being manipulated by some illicit party to trigger a great number of devices to send traffic at basically the same time to a particular target, such as a server or a computer, with the purpose of creating harmful and destructive load on the target and/or the network. Such distributed security attacks on wireless devices are commonly referred to as Distributed Denial of Service (DDoS) attacks. In particular, the above-described sensors are often subjected to DDoS attacks, which will be described in more detail below as an example of distributed security attacks.

An attacked sensor may be modified with malicious code to make it perform additional functions in the attacker's interest. In particular, the sensor may be modified to attack other sensors, user devices or network services. When several sensors are modified in such a way, they can together be orchestrated to perform a distributed attack. Considering the high number of sensors often being deployed, such attacks can be devastating as a huge number of sensors could be programmed to send traffic toward a single destination in order to make that destination fail under the high load.

However, in wireless networks of today it is not possible to detect when a distributed attack is likely to occur and therefore cannot be stopped in time, i.e. before the target and/or network has been significantly damaged by the attack such as by functional failure. It is also difficult to trace such attacks since it would be necessary to inspect and analyze a huge amount of traffic in the network, including legitimate and normal traffic.

SUMMARY

It is an object of embodiments described herein to address at least some of the problems and issues outlined above. It is possible to achieve this object and others by using a method and an attack detection function as defined in the attached independent claims.

According to one aspect, a method is performed by an attack detection function for detection of a distributed attack in a wireless network to which multiple wireless devices are connected. In this method, the attack detection function first detects that characteristics of a traffic flow from each of a plurality of wireless devices fulfil a predefined threshold condition related to abnormal traffic originating from the wireless devices, and then identifies changes of the traffic flows from the wireless devices. Based on said identified changes of the traffic flows, the attack detection function further determines whether the wireless devices are used in the distributed attack.

According to another aspect, an attack detection function is arranged to enable or support detection of a distributed attack in a wireless network to which multiple wireless devices are connected. The attack detection function is configured to detect that characteristics of a traffic flow from each of a plurality of wireless devices fulfil a predefined threshold condition related to abnormal traffic originating from the wireless devices. The attack detection function is also configured to identify changes of the traffic flows from the wireless devices, e.g. based on statistics on previous traffic originating from the wireless devices. The attack detection function is further configured to determine whether the wireless devices are used in the distributed attack, based on said identified changes of the traffic flows.

By using either of the above method and attack detection function, it is an advantage that a distributed attack can be detected in a wireless network in an automatic and reliable manner, and that analysis of the traffic can be more efficient since the "suspicious" traffic can be identified and inspected. Hence, instead of inspecting all traffic from wireless devices, it is only necessary to inspect the identified suspicious traffic, i.e. traffic that indicate some abnormal behavior of the wireless devices. As a result, the transmission latency for legitimate and normal traffic from wireless devices will be reduced.

The above method and attack detection function may be configured and implemented according to different optional embodiments to accomplish further features and benefits, to be described below.

A computer program is also provided comprising instructions which, when executed on at least one processor in the attack detection function, cause the at least one processor to carry out the method described above. A carrier is also provided which contains the above computer program, wherein the carrier is one of an electronic signal, optical signal, radio signal, or a computer readable storage medium.

BRIEF DESCRIPTION OF DRAWINGS

The solution will now be described in more detail by means of exemplary embodiments and with reference to the accompanying drawings, in which.

DETAILED DESCRIPTION

The embodiments described herein may be used in a procedure for detecting whether a distributed attack is or has been made by manipulation of wireless devices in a wireless network. Some conditions and situations where such attacks could occur are described below.

The so-called "Internet of Things", IoT, is generally used to denote a situation where billions of sensors are connected in future networks. Due to the diverse set of technologies that could be used in IoT sensors, these sensors may be connected to a set of IoT gateways which receive data from the sensors and then provide IP connectivity to corresponding servers. Even though IoT sensors are used in this description as an illustrative example, the embodiments and features described herein are not limited to IoT sensors.

The IoT sensors are usually in sleep mode to save energy, e.g. by reduced battery consumption, and depending on the configurations, the IoT sensors may wake up for short time periods to perform some operations. In general, most IoT sensors can be classified, depending on their active time periods, in two main groups: The IoT sensors that may periodically transmit information (e.g. temperature sensors) and IoT sensors that may transmit information only when triggered by some conditions (e.g. smoke detectors).

It is often desirable in the deployment of IoT to provide some security. Particularly, the large number of IoT sensors with different technologies and operating systems makes it difficult to inspect and monitor all sensors to find vulnerabilities and anomalies. Because of their simplicity, the security implementation may need to be rudimentary, also to save costs. An example of security attacks in IoT is the above-mentioned DDoS attacks in which the attackers are able to exploit vulnerabilities in IoT sensors by waking up hundreds of IoT sensors in order to create an army of botnets to perform a distributed attack on a specific target. In this description, the term "distributed attack" is used to generally represent any such attacks that involve manipulation of plural wireless devices, such as IoT sensors, in order to make the devices operate in a way that could harm the network or any number of nodes and entities therein.

On the other hand, a recent trend in networking is to make the future networks programmable in which the operators can define a set of network functions and decide about the forwarding behavior of networking elements. Software-Defined Networking, SDN is a key technology to provide a high level of network programmability and manageability in future networks. SDN provides a higher level of network abstraction and more flexibility and controllability in infrastructure networks. OpenFlow is the most well-known protocol in SDN networks which provides per-flow control over network resources.

SDN will be part of 5G networks to provide higher controllability when managing a large number of wireless devices such as IoT sensors, although, there has been a limited effort to implement SDN with IoT especially as a security prevention mechanism. It has been described in Carlos Gonzalez, "A Novel Distributed SDN-Secured Architecture for the IoT", International Conference on Distributed Computing in Sensor Systems, 2016, that SDN can be used to implement per-flow analysis on IoT sensors using the SDN-enabled gateways. It has also been described in Peter Bull and others, "Flow Based Security for IoT Devices using an SDN Gateway", IEEE 4th International Conference on Future Internet of Things and Cloud, 2016, how the security may be improved by deploying a distributed SDN architecture to securely connect sensors that are located in different networks.

Some problems that could occur in a wireless network will now be discussed. As already explained above, it is difficult to inspect and monitor each sensor when a large number of devices such as IoT sensors and different technologies are used in the network. The large number of devices or sensors may be connected to several gateways in distributed networks and it is very difficult to analyze the status of each sensor. Considering the dense and distributed deployment of sensors, a DDoS attack can start from different parts of the network. The security solutions at individual gateways may not be effective or sufficient to prevent DDoS attacks.

Furthermore, the SDN-based solutions often have scalability problem to manage large number of sensors as they may require changes in all IoT gateways. In fact, it may not be feasible or "scalable" to manage large number of IoT sensors in centralized controllers. Also, SDN-enabled gateways require changes in existing gateway products.

The above problems may be addressed or solved by employing an attack detection function as described herein. In one example, a scalable approach based on SDN may be used to prevent DDoS attacks from IoT sensors. In this solution it may be utilized that many IoT sensors are typically active in a short period of time to transmit data. For example, a control node such as an SDN controller may send notifications to a DDoS detector for data flows in which some pre-defined threshold values are exceeded or surpassed. The term "DDoS detector" is used herein as an example of an attack detection function. After receiving such notifications, the DDoS detector analyzes changes in the data flows e.g. related to amount of traffic, burst size and/or destinations of data flows. the DDoS detector may then notify the SDN controller to drop or reroute the traffic at a transport network associated to the wireless network.

Some examples of benefits and advantages that could be achieved by using the solution and embodiments described herein are as follows:

- It is possible to detect and prevent DDoS attacks from IoT devices located at the edge of wireless or cellular networks.
- This solution is scalable and deployable in large networks, especially in future 5G networks.
- This solution does not need any change in IoT gateways or sensors. Also, this solution does need any change in OpenFlow protocol or SDN architecture.
- Instead of inspecting all originated traffic from sensors, it is only necessary to inspect "suspicious" traffic, i.e. traffic that indicate some abnormal behavior of the devices or sensors. This will reduce the transmission latency for legitimate and normal traffic from wireless devices such as IoT sensors.

An example of how the solution may be employed in terms of actions which may be performed by an attack detection function or similar entity, will now be described with reference to the flow chart in FIG. 1 which illustrates a procedure for detection of a distributed attack in a wireless network to which multiple wireless devices are connected. The attack detection function in this procedure may alternatively be called a supervising node or function, or a network monitoring node or function, or a Distributed Denial of Service, DDoS detector, just to mention a few non-limiting examples of how the function described herein could be named. Some optional example embodiments that could be used in this procedure will also be described.

A first action 100 illustrates that the attack detection function detects that characteristics of a traffic flow from each of a plurality of wireless devices fulfil a predefined threshold condition related to abnormal traffic originating from the wireless devices. In another action 102, the attack detection function further identifies changes of the traffic flows from the wireless devices, e.g. based on statistics on previous traffic originating from the wireless devices. Such changes of the traffic flows may include increased traffic rate, a changed interval of bursts and/or changed destination of the traffic flows, either of which may indicate an abnormal behavior associated with distributed attacks.

In another action 104, based on said identified changes of the traffic flows, the attack detection function also determines whether the wireless devices are used in the distributed attack. This determination may be done when detecting that the identified changes of the traffic flows indicate a behavior of the wireless devices which could potentially contribute to a distributed attack. For example, a distributed attack may be suspected when the identified changes of the traffic flows exceed some thresholds or the like, which will be described in more detail below.

In an optional further action 106, the attack detection function may further send a notification or the like to a control node, which is also called a "Software-Defining Networking, SDN controller" herein, so that the traffic flows from the wireless devices can e.g. be interrupted or rerouted in such a way that the distributed attack is handled in a suitable manner. The detected distributed attack may e.g. be handled by eliminating the attack or reducing its negative effect in some way, which is however outside the scope of this description.

Figure 1:
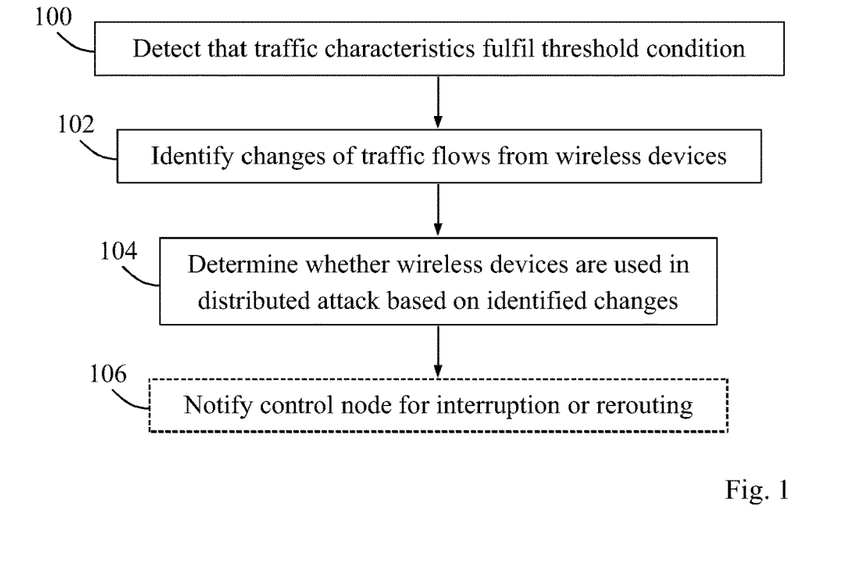
FIG. 1 is a flow chart illustrating a procedure in an attack detection function, according to some possible embodiments.
Figure 2:
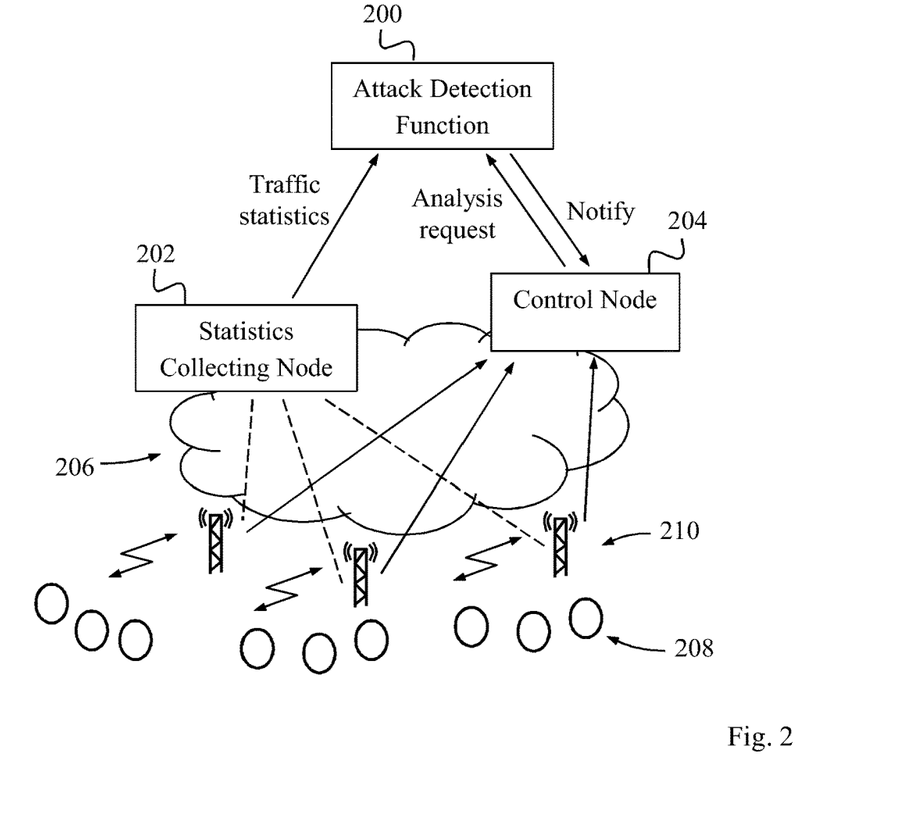
FIG. 2 is a communication scenario illustrating an example of how the solution may be employed, according to some possible embodiments.

FIG. 2 illustrates a communication scenario where a procedure for detection of a distributed attack in a wireless network takes place in the manner described above for FIG. 1, involving an attack detection function 200, a statistics collecting node 202 and a control node 204. A wireless network 206 is also shown to which multiple wireless devices 208 are connected via network nodes 210 which thereby provide radio access to the wireless network 206. The wireless devices 208 may include IoT devices, such as sensors etc., although the examples and embodiments herein are not limited to such devices.

When the wireless devices 208 send traffic over the wireless network 206, such as sensor measurements and/or reports, the network nodes 210 detect and measure the traffic flows over time and the statistics collecting node 202 collects statistics on the traffic from the network nodes 210, as indicated by the dashed arrows. The control node 204 may receive notifications from the network nodes 210, as indicated by full arrows therefrom, indicating that the predefined threshold condition is fulfilled by the traffic flows. If so, the control node 204 sends an analysis request to the attack detection function 200 which then obtains traffic statistics from the statistics collecting node 202.

Thereby, the attack detection function 200 is able to identify changes of the traffic flows based on the traffic statistics obtained from the statistics collecting node 202, as in the above-described action 102, and to determine whether the wireless devices 208 are used in a distributed attack based on the identified changes, as in the above-described action 104.

In an example embodiment, the above-mentioned predefined threshold condition may include at least one of:
- the amount of traffic from the at least one wireless device exceeds a predefined traffic rate threshold, and
- a size of packet bursts transmitted by the at least one wireless device exceeds a predefined burst size threshold.

In another example embodiment, said changes of the traffic flows may include any of: increased traffic rate, changed burst interval and changed destination of the traffic flows.

In another example embodiment, said identifying may be performed based on statistics on traffic originating from the wireless devices, which statistics may be obtained from a statistics collecting node which is connected to one or more base stations serving the wireless devices. The statistics collecting node may alternatively be denoted an "Aggregation Observability Function, AOF", as in some of the following sections.

In another example embodiment, said detecting may comprise receiving an analysis request from a control node when the control node has received, from one or more network nodes through which the traffic flows pass, notifications indicating that the predefined threshold condition is fulfilled by the traffic flows.

In another example embodiment, when it is determined that the wireless devices are used for the distributed attack, the control node may be notified to interrupt or reroute said traffic flows. In another example embodiment, the network node(s) may include a switch in a transport network connected to the wireless network serving the wireless devices.

In another example embodiment, it may be determined that the multiple wireless devices have been manipulated to perform a DDoS (Distributed Denial of Service) attack on the wireless network based on the identified changes of said traffic flows.

In another example embodiment, different predefined threshold conditions may be applied for different wireless devices.

In another example embodiment, threshold values in the threshold conditions may be determined based on any of: predefined default threshold values, type or identity of the wireless devices, and previous measurements on normal traffic from the wireless devices.

In another example embodiment, the wireless devices may include IoT sensors and/or IoT gateways.

Some non-limiting examples of how the above-described embodiments may be implemented in practice, will now be described where IoT devices are connected to IoT gateways which transmit traffic from the IoT devices to network nodes over radio. However, these examples could also be applied for other types of wireless devices although IoT devices are used as an illustrative example of practical implementation.

Most of the IoT sensors may be active in a periodic manner to transmit data, while some of the IoT sensors may only transmit data if a condition happens. To create a DDoS attack, a plurality of IoT sensors in the network should become active during a short period, each sensor sensing traffic at roughly the same time in order to transmit huge total amount of data to one or more specific destinations. In fact, because of the small processing power available in IoT sensors, to make a successful DDoS attack, several IoT sensors attached to different gateways need to simultaneously wake up and transmit data to the one or more specific destinations.

Since it is difficult to predict the active time of individual sensors, it is necessary to monitor or detect the traffic transmitted from IoT gateways. This traffic indicates the normal transmission rate from the IoT sensors in each period of time and based on that traffic rate, the normal traffic can be measured and the future transmission rate of IoT sensors may even be predicted. Furthermore, it may not be useful to rely on measurements from only one IoT gateway, and in order to predict a DDoS attack it may be necessary to consider traffic transmitted from several IoT gateways.

In the embodiments herein, one or more of the following metrics may be considered for triggering detection of a DDoS attack. These metrics may not be individually useful to detect a DDoS attack, and it may thus be helpful to use at least two of these metrics to detect a DDoS attack.

Increased traffic rate: One sign or indication of a DDoS attack could be when traffic from several IoT gateways increases simultaneously. This means that if the total amount of traffic transmitted from several IoT gateways to a specific destination increase, then this might imply or suggest a DDoS attack.

Changes in burst interval or size: Each IoT sensor may have a specific burst time in which it transmits traffic to a specific server. A burst is a group of packets transmitted together and the number of packets in a burst may be referred to as the "burst size". Between the bursts, the sensor is sleeping or inactive. This burst size is usually constant and the bursts typically occur at specific points of time. The burst interval basically refers to the time between two consecutive bursts and the bursts may be transmitted periodically or when triggered by a condition, as described above.

The burst interval or size can also be detected when several sensors are connected to a gateway since the peak rate in the received traffic from gateway may occur at specific periods of time. In particular, it may be useful to detect a situation where the independent bursts of the sensors behind a gateway becomes synchronized so that all sensors send at the same interval, which could indicate an attack. It may also be useful to detect a situation where bursts are replaced by constant traffic, as regular IoT traffic typically is "bursty" and the attacker may modify devices to constantly send traffic to overload a destination.

Changes in destinations: The IoT sensors usually transmit traffic to specific destinations such as servers. If the address information (e.g. IP address) of any of destinations change, then it might imply a DDoS attack.

Figure 2A:
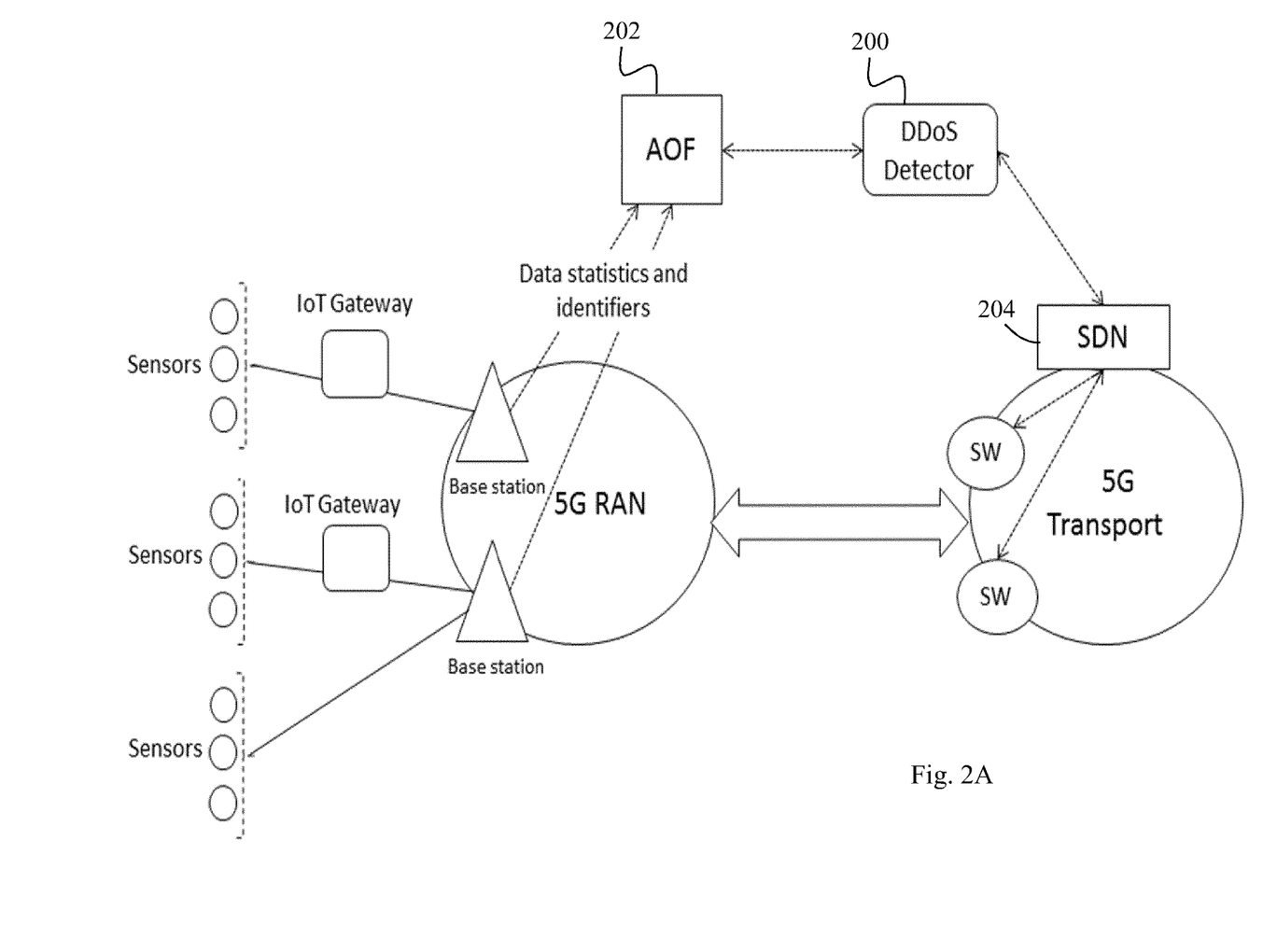
FIG. 2A is a communication scenario illustrating another example of how the solution may be employed in practice in a 5G network, according to some possible embodiments.

FIG. 2A illustrates another non-limiting example of how the solution may be employed in practice in a 5G wireless network architecture by means of a DDoS detector 200 which thus corresponds to the attack detection function 200 in FIG. 2. The wireless (or cellular) network comprises a 5G RAN (Radio Access Network) including base stations (or network nodes) of a radio network, and a 5G transport network, which in turns employs SDN technology and implements service chaining. The SDN technology includes a logically centralized SDN controller 204, corresponding to the control node 204 in FIG. 2, and a set of SDN switches "SW" which forward the data flows coming from multiple sensors. In this solution it may be assumed that OpenFlow is used as a non-limiting example for defining the data flows, but other SDN protocols could be used as well. The AOF node 202, corresponding to the statistics collecting node 202 in FIG. 2, collects flow statistics and identifiers from the base stations at the edge of the network.

The base stations receive IoT traffic from sensors connected via IoT gateways, or directly to the base stations. In this example, IoT sensors are shown and described although the description may be valid for any type of wireless devices. The separation of IoT traffic from other traffic at the base stations is not described here but it can, for example, be implemented based on network slicing methods in 5G. The base stations then send the statistics of the traffic (i.e. the data flows) to the AOF node 202. The DDoS detector 200 is responsible for identifying and analyzing any abnormal traffic in the network. The DDoS detector 200 is able to receive events and observations from the SDN controller 204 and the DDoS detector may also control the behavior of the transport network by using APIs (Application Programming Interfaces) provided by the SDN controller 204. The DDoS detector 200 may also receive the statistics and identifiers for IoT traffic from the AOF node 202.

Figure 3:
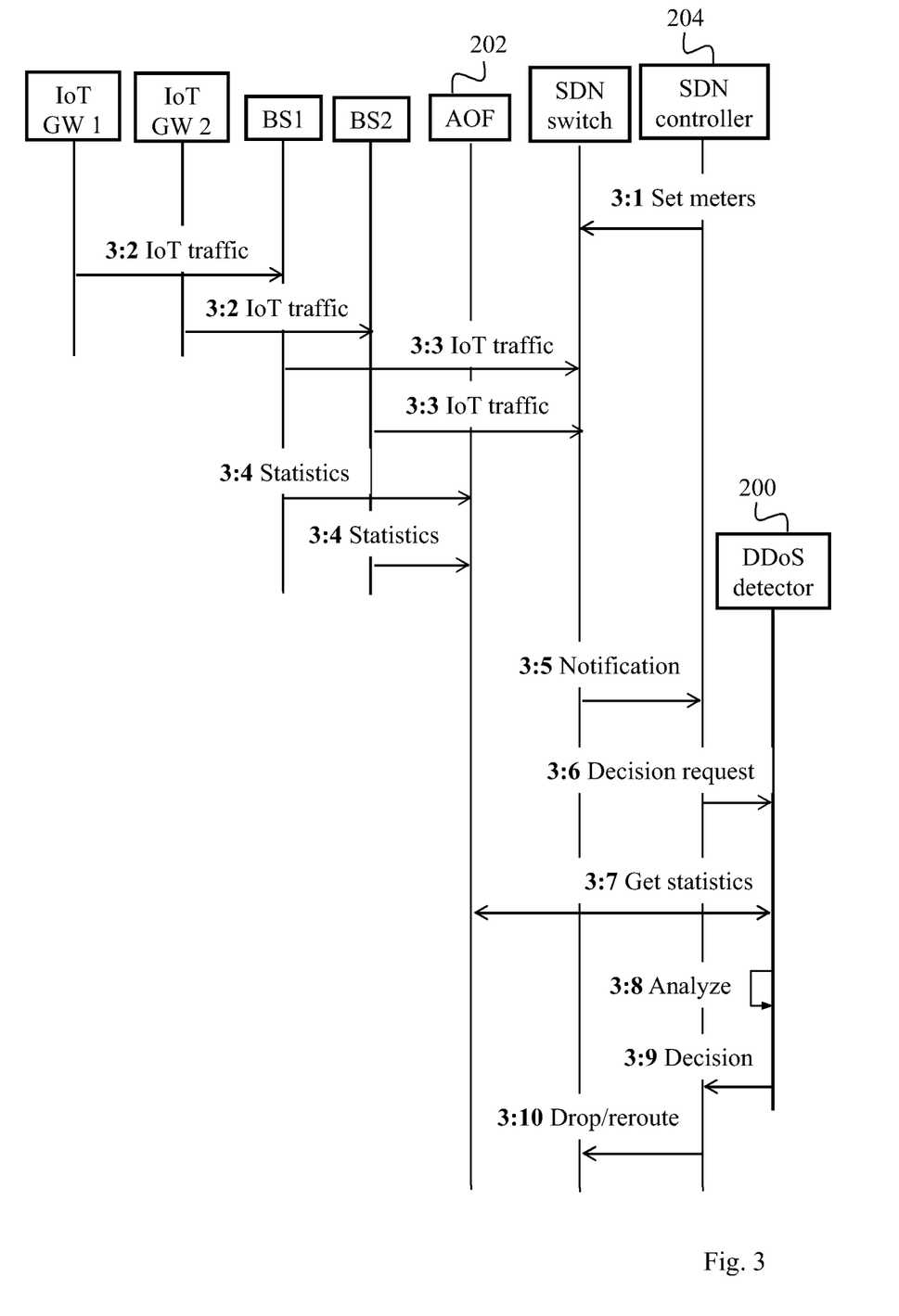
FIG. 3 is a signaling diagram illustrating an example of a procedure when the solution is used, according to further possible embodiments.

An example of how the solution may be employed will now be described with reference to the signaling diagram in FIG. 3 which illustrates how a DDoS attack may be stopped by employing at least some of the embodiments described herein. The steps 3:1-3:10 in this diagram are explained below, and with further reference to FIG. 2 such that in FIG. 3 the DDoS detector 200 corresponds to the attack detection function, the AOF 202 corresponds to the statistics collecting node, and the SDN controller 204 corresponds to the control node.

Step 3:1

Initially, the SDN controller 204 will set meters in SDN switches with specific threshold values for IoT traffic. In this example, only one such SDN switch is shown for simplicity. The meters in the SDN switches may be set for example using the well-known OpenFlow protocol. The existing OpenFlow-enabled switches (OpenFlow 1.3 and higher versions) support per flow metering techniques to mark or classify the flows and report to the SDN controller 204. These meters will be installed based on a source of IoT traffic which may be a gateway or even separate sensors directly connected to the base station. In this example, two sources of IoT traffic are denoted IoT GW 1 and IoT GW 2 which are connected to network nodes, i.e. base stations denoted BS 1 and BS 2, respectively. Any number of IoT devices, not shown, may be connected to each IoT GW 1 and 2.

A threshold value may have a default value or it can be based on previous measurements of normal traffic, which might be changed periodically by the SDN controller 204. Also, suitable threshold values may be selected based other factors such as available network capacity, or normal transmission rate in an IoT slice, or subscription information. The meters and/or threshold values should be set so that they trigger on exceptional traffic, i.e. traffic that deviates from normal or expected behavior. One possible way is to set the normal traffic plus a 20% threshold, although other ways are also possible. This percentage may further depend on how much variation is detected in the normal traffic.

Step 3:2

The sensors connected to the gateways IoT GW 1 and IoT GW 2 (or the directly connected sensors) may start to transmit large amount of traffic to the base stations BS 1 and BS 2, respectively.

Step 3:3

The base stations BS 1 and BS 2 will then forward traffic received from IoT gateways or sensors to the transport network, in this example to the SDN switch.

Step 3:4

The base stations BS 1 and BS 2 will also periodically transmit any measured or observed statistics and identifiers for IoT traffic to the AOF node 202, which stores the statistics which is made available for future analysis by the DDoS detector 200.

Step 3:5

When a switch receives an exceptionally large amount of IoT traffic that is higher than a specified threshold (implemented e.g. as OpenFlow meters), the switch will take the action of transmitting a notification to the SDN controller 204. The switch may send several notifications for each meter, for example if it receives high rate IoT traffic from several gateways.

Step 3:6

If the SDN controller 204 receives notifications for high rate traffic in just one gateway, it may ignore the notification and route the traffic normally. This may be the case when some IoT sensors conditionally become active and start to transmit data, and a single gateway exceeding its normal traffic is not yet an indication of a DDoS. However, if the SDN controller 204 receives several notifications for high rate traffic in several gateways, then it might indicate a DDoS attack. In this case, the SDN controller 204 may send a request to the DDoS detector 100 for further and in-depth analysis.

Step 3:7

After DDoS detector 100 receives such a notification from the SDN controller 204, it sends a request for fine-grained information about the IoT traffic from the AOF node 202, in order to identify any changes of the traffic flows from the wireless devices or IoT sensors.

Step 3:8

As already discussed, the DDoS detector 200 may consider three conditions for a DDoS attack regarding the following: increased traffic rate, changes in burst interval or size, and changes in destinations. Based on the analysis by the DDoS detector, if at least two of these conditions are fulfilled, then the DDoS detector 200 may consider it as a possible DDoS attack.

Step 3:9

The DDoS detector then sends a decision or notification to the SDN controller 204, to indicate that the abnormal behavior has occurred in the network.

Step 3:10

Based on the decision or notification and network configurations, after the SDN controller 204 receives the decision or notification, it may drop the traffic or it may reroute the traffic to other services such as DPIs (Deep Packet Inspections) or monitoring systems.

Figure 4:
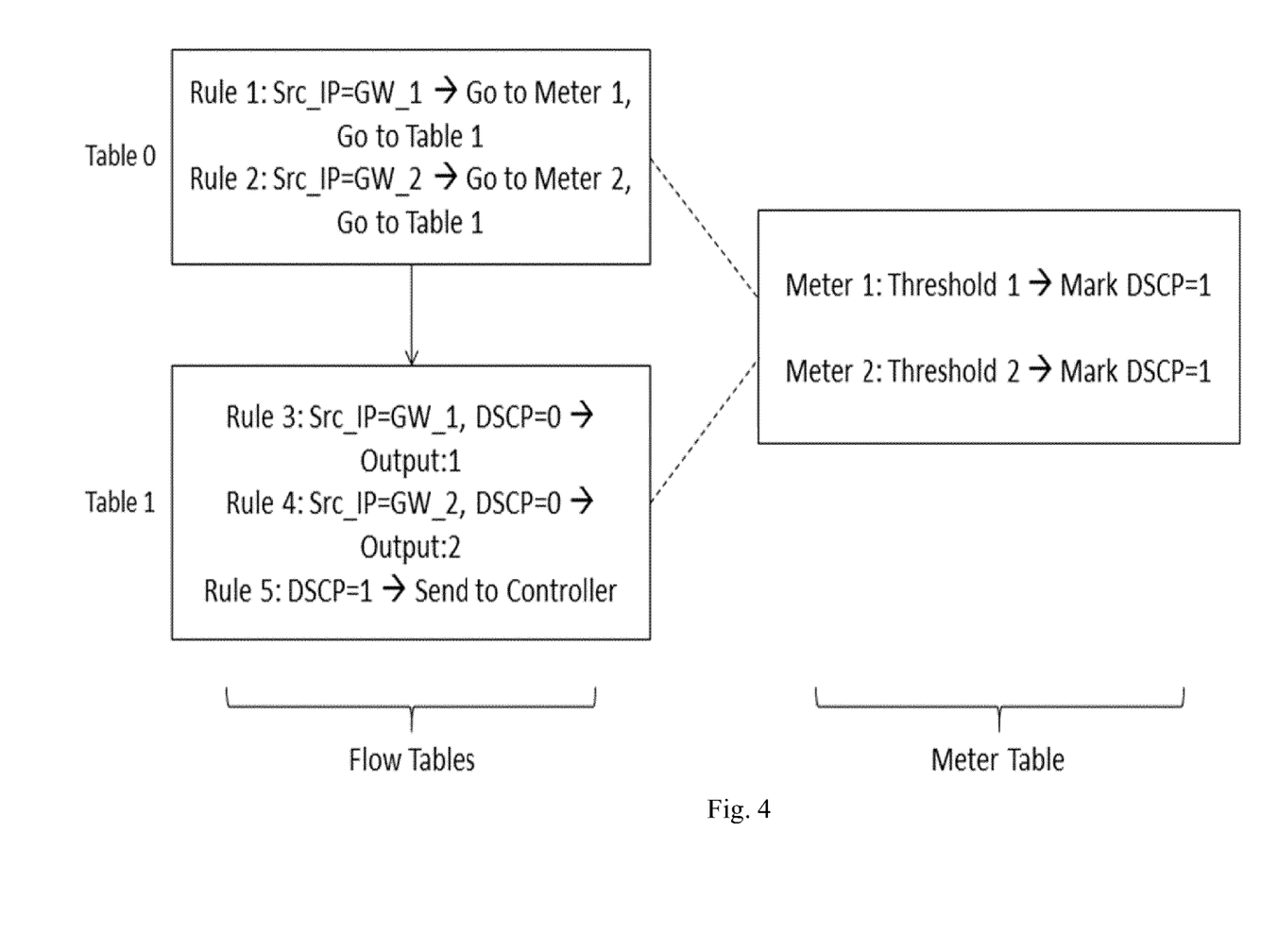
FIG. 4 is a diagram illustrating an example of how metering techniques on the data flows may be implemented in a transport network, according to some possible embodiments.

FIG. 4 shows an example of how metering techniques may be implemented on data flows in the transport network. OpenFlow protocol (version 1.3 and newer versions) supports a multi-table approach and metering techniques. In a Flow table 0, the rules are set for forwarding traffic from each gateway, and the rules are mapped to a set of meters in a Meter table. Each meter has a threshold value and if the received traffic in table 0 surpasses the threshold, the DSCP field in IP packets of the traffic will be marked. In another Flow table 1, if received data packets are not marked, "normal traffic" will be set out from the switch (output port), otherwise, it will be forwarded to the controller as a notification. The controller can then check if the packet is already marked and the source IP of the packet to detect any violations from specific gateways.

Since cloud technology will be part of 5G networks, this solution may further be used to protect services offered in private or public cloud networks. Moreover, some of the components that may be used in this solution, such as the DDoS detector 200, the SDN controller 204 or the AOF node 202, could be deployed as a cloud-based service.

The embodiments herein could be used to provide an advantage of detecting suspicious traffic or data flows from several IoT devices that surpass the assigned thresholds without introducing additional overhead for legitimate data flows which are thus not impacted. By using the above-described attack detection function or DDoS detector, it is possible to use available statistics to implement in-depth analysis on potentially malicious traffic flows. The analysis performed by the attack detection function or DDoS detector is based on changes in the traffic flows such as the amount of traffic, the burst size, burst interval or the destination of the traffic or data flows from wireless devices such as IoT sensors.

Figure 5:
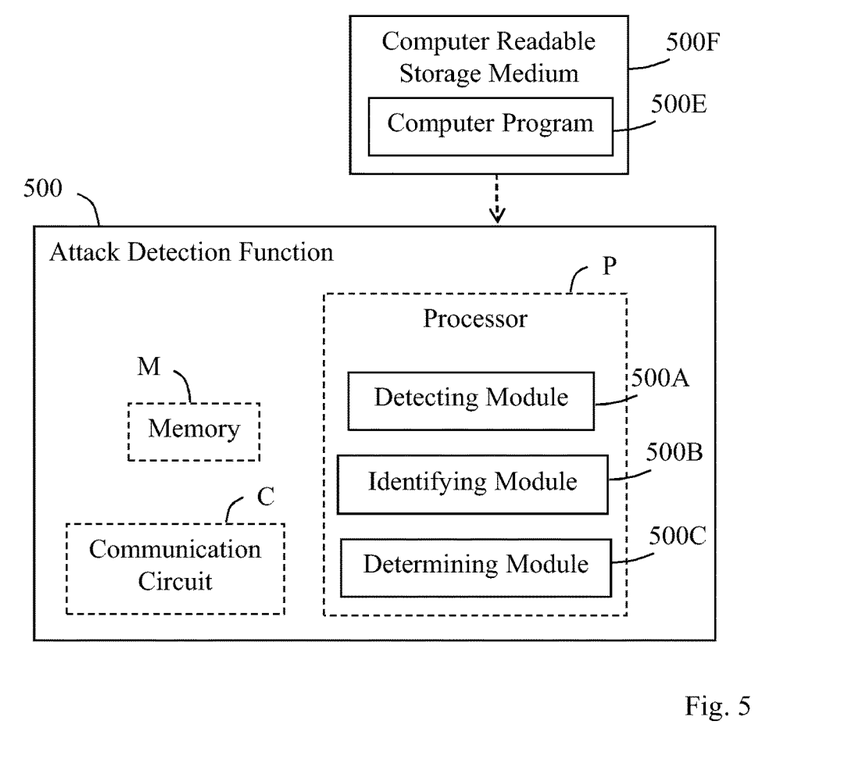
FIG. 5 is a block diagram illustrating how an attack detection function may be configured, according to further possible embodiments.

The block diagram in FIG. 5 illustrates a detailed but non-limiting example of how an attack detection function 500 may be structured to bring about the above-described solution and embodiments thereof. The attack detection function 500 may be configured to operate according to any of the examples and embodiments of employing the solution as described above, where appropriate, and as follows. The attack detection function 500 is shown to comprise a processor P and a memory M, said memory comprising instructions executable by said processor P whereby the attack detection function 500 is operable as described herein. The attack detection function 500 also comprises a communication circuit C with suitable equipment for receiving and transmitting messages and information in the manner described herein.

The communication circuit C is configured for communication with nodes in the network using suitable protocols depending on the implementation. This communication may be performed in a conventional manner over a communication network employing radio links for wireless communication, which is not necessary to describe here as such in any detail. The solution and embodiments herein are thus not limited to using any specific types of networks, technology or protocols for communication.

The attack detection function 500 is operable in a wireless network and comprises means configured or arranged to perform at least some of the actions 100-106 in FIG. 1. The attack detection function 500 is arranged or configured to enable detection of attacks in a wireless network to which multiple wireless devices are connected.

The attack detection function 500 is configured to detect that characteristics of a traffic flow from each of a plurality of wireless devices fulfil a predefined threshold condition related to abnormal traffic originating from the wireless devices. This operation may be performed by a detecting module 500A in the attack detection function 500, e.g. in the manner described for action 100 above.

The attack detection function 500 is also configured to identify changes of the traffic flows from the wireless devices, e.g. based on statistics on previous traffic originating from the wireless devices. This operation may be performed by an identifying module 500B in the attack detection function 500, e.g. as described for action 102 above.

The attack detection function 500 is also configured to, based on said identified changes of the traffic flows, determine whether the wireless devices are used in the distributed attack. This operation may be performed by a determining module 500C in the attack detection function 500, e.g. as described above for action 104.

It should be noted that FIG. 5 illustrates various functional units in the attack detection function 500, and the skilled person is able to implement these functional units in practice using suitable software and hardware. Thus, the solution is generally not limited to the shown structures of the attack detection function 500, and the functional modules or units 500A-C therein may be configured to operate according to any of the features and embodiments described in this disclosure, where appropriate.

The functional modules or units 500A-C described above may be implemented in the attack detection function 500 by means of suitable hardware and program modules of a computer program comprising code means which, when run by the processor P, causes the attack detection function 500 to perform at least some of the above-described actions and procedures. The functional modules or units 500A-C may alternatively be referred to as "means", thus including detecting means 500A, identifying means 500B and determining means 500C.

Figure 5A:
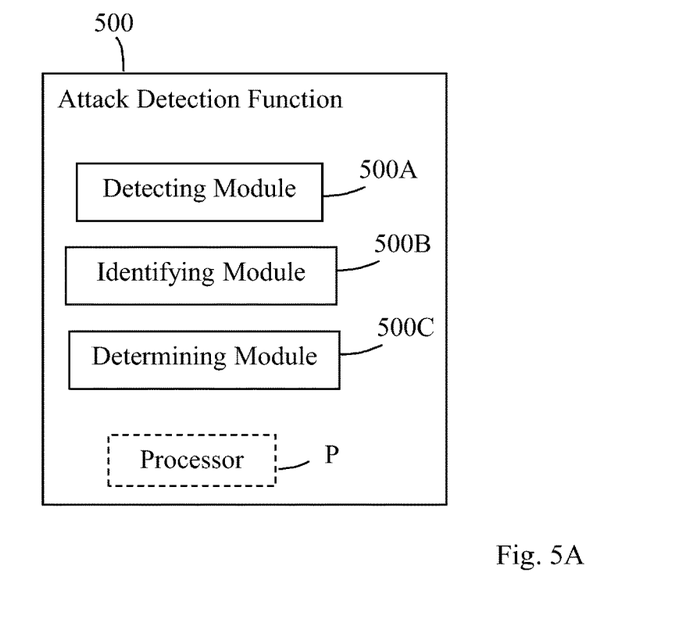
FIG. 5A is a block diagram illustrating another example of how an attack detection function may be configured, according to further possible embodiments.

FIG. 5A illustrates another possible alternative of how the attack detection function 500 may be configured with memory M", communication circuitry C" and processing circuitry P"'. The memory M" comprises instructions executable by said processing circuitry P"' whereby the attack detection function 500 is operative as described herein. The communication circuitry C" represents suitable equipment for receiving and sending information in the manner described herein and using a suitable protocol for the described communication depending on the implementation. The solution and embodiments herein are thus not limited to using any specific types of networks, technology or protocols for communication.

In either FIG. 5 or FIG. 5A, the processor P and processing circuitry "P", respectively, may comprise a single Central Processing Unit (CPU), or could comprise two or more processing units such as CPUs. For example, the processor P and/or processing circuitry P"' may include a general purpose microprocessor, an instruction set processor and/or related chip sets and/or a special purpose microprocessor such as an Application Specific Integrated Circuit (ASIC). The processor P and/or processing circuitry P"' may also comprise a storage for caching purposes.

Each computer program may be carried by a computer program product in the attack detection function 500 in the form of a memory having a computer readable medium and being connected to the processor P and/or processing circuitry P"'. The computer program product or memory in the attack detection function 500 may thus comprise a computer readable medium on which the computer program is stored e.g. in the form of computer program modules or the like. For example, the memory may be a flash memory, a Random-Access Memory (RAM), a Read-Only Memory (ROM), an Electrically Erasable Programmable ROM (EEPROM) or hard drive storage (HDD), and the program modules could in alternative embodiments be distributed on different computer program products in the form of memories within the attack detection function 500.

The solution described herein may be implemented in the attack detection function 500 by means of a computer program product such as a computer readable storage medium 500F comprising a computer program 500E with computer readable instructions which, when executed on the attack detection function 500, cause the attack detection function 500 to carry out the actions according to any of the above embodiments, where appropriate.

While the solution has been described with reference to specific exemplifying embodiments, the description is generally only intended to illustrate the inventive concept and should not be taken as limiting the scope of the solution. For example, the terms "attack detection function", "wireless device", "statistics collecting node", "control node", "network node", "IoT sensor", "IoT gateway", "SDN controller", "SDN switch", "DDoS detector" and "AOF node" have been used throughout this disclosure, although any other corresponding entities, functions, and/or parameters could also be used having the features and characteristics described here. The solution may be implemented according to any of the appended embodiments.

ABBREVIATIONS

DDoS Distributed Denial of Service
DSCP Differentiated Services Code Point
GW Gateway
IoT Internet of Things
RAN Radio Access Network
SDN Software-Defined Networking
SW Switch

The invention claimed is:

1. A method performed by an attack detection system, for detection of a distributed attack in a wireless network to which multiple wireless devices are connected, the method comprising:
   detecting that characteristics of a traffic flow from each of a plurality of wireless devices fulfil a first predefined threshold condition related to abnormal traffic originating from the wireless devices, wherein the first predefined threshold condition related to abnormal traffic is that an amount of traffic from each one or more wireless devices exceeds a predefined traffic threshold and further wherein the predefined traffic threshold is calculated based on a detected normal traffic and a variation detected in the normal traffic;
   in response to the detecting, identifying changes of the traffic flows from the wireless devices;
   determining whether the wireless devices are used in the distributed attack based on whether the identified changes of the traffic flows exceed second thresholds; and
   in response to determining that the wireless devices are used in the distributed attack, performing one or more mitigating actions.

2. The method according to claim 1, wherein said changes of the traffic flows include any of increased traffic rate, changed burst interval, and changed destination of the traffic flows.

3. The method according to claim 1, wherein
said identifying is performed based on statistics on traffic originating from the wireless devices, and
the statistics are obtained from a statistics collecting node which is connected to one or more base stations serving the wireless devices.

4. The method according to claim 1, wherein
said detecting comprises receiving an analysis request from a control node, and
the control node sent the analysis request after receiving from one or more network nodes through which the traffic flows pass notifications indicating that the first predefined threshold condition is fulfilled by the traffic flows.

5. The method according to claim 4, wherein when it is determined that the wireless devices are used for the distributed attack, the control node is notified to interrupt or reroute said traffic flows.

6. The method according to claim 4, wherein one or more of said one or more network nodes is a switch in a transport network connected to the wireless network serving the wireless devices.

7. The method according to claim 1, wherein it is determined that the multiple wireless devices have been manipulated to perform a Distributed Denial of Service (DDoS) attack on the wireless network based on the identified changes of said traffic flows.

8. The method according to claim 1, wherein different predefined threshold conditions are applied for different wireless devices.

9. The method according to claim 8, wherein threshold values in the different predefined threshold conditions are determined based on any one or more of: predefined default threshold values, type or identity of the wireless devices, and previous measurements on normal traffic from the wireless devices.

10. The method according to claim 1, wherein the wireless devices include Internet of Things (IoT) sensors and/or IoT gateways.

11. An attack detection system arranged to enable or support detection of a distributed attack in a wireless network to which multiple wireless devices are connected, the attack detection system comprising a memory and processor, wherein the attack detection system is configured to:
detect that characteristics of a traffic flow from each of a plurality of wireless devices fulfil a first predefined threshold condition related to abnormal traffic originating from the wireless devices, wherein the first predefined threshold condition related to abnormal traffic is that an amount of traffic from each one or more wireless devices exceeds a predefined traffic threshold and further wherein the predefined traffic threshold is calculated based on a detected normal traffic and a variation detected in the normal traffic;
in response to the detecting, identify changes of the traffic flows from the wireless devices;
determine whether the wireless devices are used in the distributed attack based on whether the identified changes of the traffic flows exceed second thresholds; and
in response to determining that the wireless devices are used in the distributed attack, performing one or more mitigating actions.

12. The attack detection system according to claim 11, wherein said changes of the traffic flows include any of: increased traffic rate, changed burst interval, and changed destination of the traffic flows.

13. The attack detection system according to claim 11, wherein
the attack detection system is configured to perform said identifying based on statistics on traffic originating from the wireless devices, and
the statistics are obtained from a statistics collecting node which is connected to one or more base stations serving the wireless devices.

14. The attack detection system according to claim 11, wherein
the attack detection system is configured to perform said detecting by receiving an analysis request from a control node, and
the control node is configured to send the analysis request after receiving from one or more network nodes through which the traffic flows pass notifications indicating that the predefined threshold condition is fulfilled by the traffic flows.

15. The attack detection system according to claim 14, wherein when it is determined that the wireless devices are used for the distributed attack, the attack detection system is configured to notify the control node to interrupt or reroute said traffic flows.

16. The attack detection system according to claim 14, wherein one or more of said one or more network nodes is a switch in a transport network connected to the wireless network serving the wireless devices.

17. The attack detection system according to claim 11, wherein the attack detection system is configured to determine that the multiple wireless devices have been manipulated to perform a Distributed Denial of Service (DDoS) attack on the wireless network based on the identified changes of said traffic flows.

18. The method according to claim 1, further comprising:
receiving an analysis request for analyzing the traffic flow transmitted by each of the plurality of wireless devices;
as a result of receiving the analysis request, transmitting towards a statistics collecting node a request for traffic information about traffic flows transmitted by the plurality of wireless devices; and
as a result of transmitting the request for the traffic information, receiving the traffic information transmitted by the statistics collecting node, wherein
the changes of the traffic flows are identified using the received traffic information.

19. The method according to claim 1, further comprising:
one or more network nodes receiving the traffic flow transmitted by each of the plurality of wireless devices;
said one or more network nodes determining whether the characteristics of the received traffic flow fulfil the first predefined threshold condition;
as a result of determining that the characteristics of the received traffic flow fulfil the first predefined threshold condition, said one or more network nodes transmitting towards a control node a notification indicating that the characteristics of the received traffic flow fulfil the first predefined threshold condition;
as a result of receiving the notification, the control node transmitting towards an attack detection entity an analysis request; and
after receiving the analysis request, the attack detection entity obtaining traffic statistics information from a statistics collecting node, wherein the changes of the traffic flows are identified by the attack detection entity based on the received traffic statistics information.

\* \* \* \* \*